United States Patent
Robin

[15] 3,641,480
[45] Feb. 8, 1972

[54] BATTERY TERMINAL GUARD

[72] Inventor: Edward L. Robin, 115 Glacier Circle, Vacaville, Calif. 95688

[22] Filed: Apr. 5, 1971

[21] Appl. No.: 130,988

[52] U.S. Cl. .................................................339/116 R
[51] Int. Cl. ....................................................H01r 11/26
[58] Field of Search................339/114, 115, 116, 206, 117

[56] References Cited

UNITED STATES PATENTS 1,722,203   7/1929   Day........................................339/116 R
2,542,056   2/1951   Ravenscroft........................339/115 R
2,809,365   10/1957  Broske................................339/213 X
2,235,062   3/1941   Bak....................................339/115 R Primary Examiner—Richard E. Moore
Attorney—Owen, Wickersham & Erickson

[57] ABSTRACT

A device for preventing the corrosion or sulfation of a cable connector on the battery terminal includes a flexible casing that fits snugly around the connector and the base of the terminal. A top cover element retained by the casing has a grease fitting so that corrosion preventive material can be forced into the casing to surround the connector.

5 Claims, 6 Drawing Figures

PATENTED FEB 8 1972
3,641,480
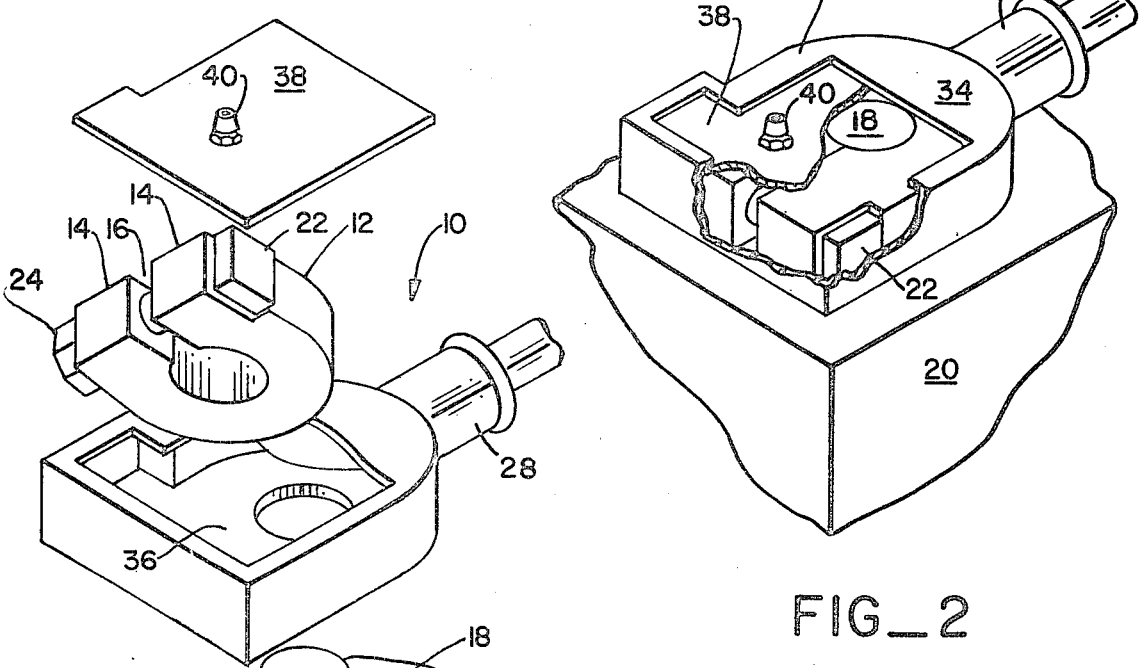
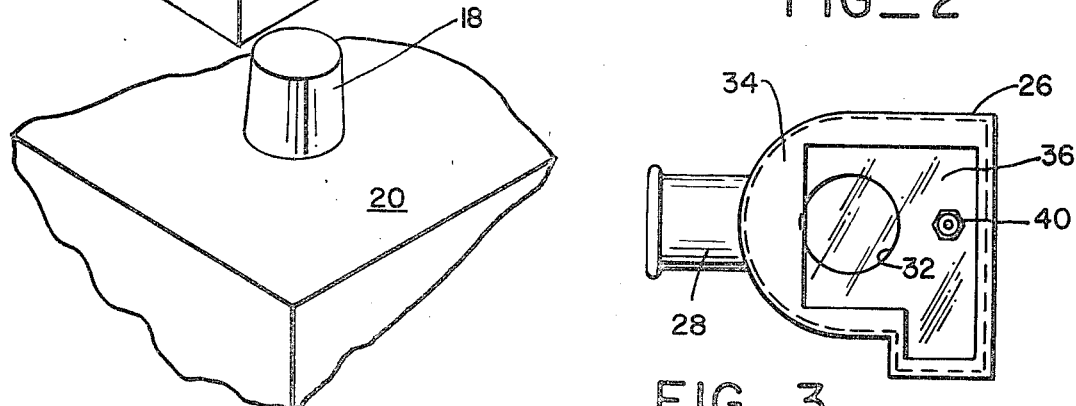
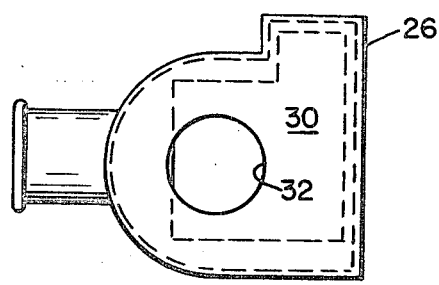
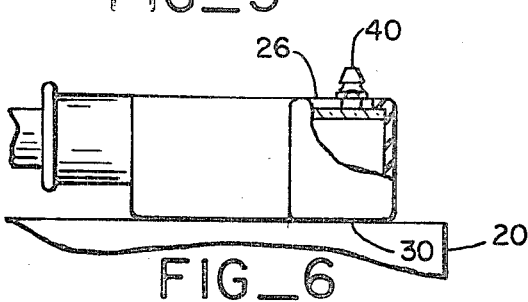
INVENTOR.
EDWARD L. ROBIN
BY
Owen, Wickersham & Erickson
ATTORNEYS 3,641,480

BATTERY TERMINAL GUARD

BACKGROUND OF THE INVENTION

This invention relates to corrosion-protective or preventive devices for electrical connections.

Wet cell batteries such as the convention lead sulphate-type batteries used in automobiles, boats and other vehicles have long presented a serious problem of corrosion or sulphation at the terminals. Generally, the problem arises due to the constant evaporation of the battery electrolyte through its air vents. When this vapor contacts metal parts as on the battery terminal and its attached connector, a wide powdery corrosion is formed. Ultimately, this corrosion can seriously damage the battery terminals and connectors which will cause malfunction that can shorten the battery life, destroy its effectiveness or even create hazards to safe vehicle operation.

A general object of the present invention is to provide a solution to the aforesaid problem of battery terminal-connector corrosion.

More specifically, an object of the present invention is to provide a device that will surround the cable connector when it is on the battery terminal; that will seal around the base of the terminal post and which will retain grease or some other corrosion preventative compound around the connector.

Another object of the present invention is to provide a protective device for cable connectors on battery terminals that can be readily adapted to various forms or shapes of cable connectors; that can be easily installed; and that is particularly well adapted for ease and economy of manufacture.

SUMMARY OF THE INVENTION

In my invention, the aforesaid objects are accomplished by a guard or sealing element in the forming of a casing that is made of some suitable flexible and nonconductive material and shaped to fit around the cable connector. A bottom wall in this sealing element fits snugly around the base of the battery terminal post and the upper side of the element has a removable cover. The latter cover is provided with a standard grease fitting so that when the protective device is installed, it forms essentially a leak-proof covering and grease forced through the fitting will be retained within the device surrounding the cable connector, thereby providing an effective corrosion barrier.

Other objects, advantages and features of the invention will become apparent from the following detailed description of one embodiment thereof presented with the accompanying drawings.

BRIEF DESCRIPTION OF THE DRAWINGS

In the drawings:

FIG. 1 is an exploded view in perspective showing a protective device embodying the principles of my invention;

FIG. 2 is a view in perspective showing the device of FIG. 1 assembled around the cable connector and installed on the battery terminal;

FIG. 3 is a top plan view of a protective device according to my invention;

FIG. 4 is a bottom view of the device in FIG. 3;

FIG. 5 is an end view of the device in FIG. 3, and

FIG. 6 is a side view of the device of FIG. 3 with portions broken away in section.

DETAILED DESCRIPTION OF ONE EMBODIMENT

Referring to the drawings, FIG. 1 shows a protective device 10 embodying the principles of my invention as it appears during its installation on a conventional connector 12 attached to the end of a battery cable. The connector 12 shown is the well-known split-block form having a pair of jaws 14 forming an opening 16 that fits around a standard terminal 18 of a wet cell battery 20. A machine bolt 22 extends through the ends of the jaws and a nut 24 on this bolt is tightened to draw them together.

The protective device 10 comprises a hollow casing 26 made of a flexible, nonconductive and noncorrosive material such as a suitable rubberlike or plastic material. Preferably a synthetic rubber material is used which is impervious to attack by sulphate compounds. As shown in FIGS. 3-6, this casing is formed with a shape generally the same as the cable connector which in this case is substantially oblong. For other types of connectors used on battery cables, the casing would have a different shape. The main function of the casing is that it may be easily attached to the connector and fit snugly around it when installed. Extending from one sidewall of the casing is a tubular sleeve portion 28 that will fit tightly around and form a seal with the battery cable adjacent the attached connector. On a bottom wall 30 of the casing is a circular opening 32 that is dimensioned to fit tightly around the base of the battery terminal 18 which normally has a slight taper. An upper wall 34 of the casing has a much larger opening 36 which is big enough to enable the casing to be easily installed on the connector. Actually, the upper wall provides the function of a retaining lip that extends around the periphery of the opening 36 for holding a cover member 38. This member is preferably made of a rigid, clear plastic material and is somewhat larger than the opening 36 so that it will fit underneath the retaining lip 34 and be held against the top of the connector, as shown in FIG. 2. Fixed to the cover member is a standard grease fitting 40.

When my protective device is installed the flexible casing is first placed on the battery cable so that it surrounds and conforms to the connector 12 and the sleeve portion 28 fits around the battery cable. The connector and attached casing are now placed over the battery cable and the connector jaws can be tightened, if necessary. Now, the cover member 38 is placed within the casing so that it covers the connector and the battery terminal. As shown in FIG. 6, the bottom casing wall 30 forms a protective barrier between the connector and the battery and the opening 32 fits around the terminal so that even corrosive vapor cannot easily pass through it. Now, a standard grease gun can be attached to the fitting 40 and grease or some other protective material can be forced into the casing. Since the device 10 is sealed around the battery terminal, the connector cable and at the top of the casing around the cover member 38 the grease forced into the casing is retained within it and forms a protective coating around the connector that further prevents corrosion. Using the transparent covering member 38 a visual check can quickly determine if adequate grease is present.

As mentioned, the casing 12 may have any desired shape depending on the connector used and it may be made by inexpensive molding techniques. It should, therefore, be apparent that my invention provides a unique and effective solution to the problem of battery sulphation of corrosion. In addition to prolonging battery life, it increases automobile safety by insulating battery terminals from accidental contacts with metal objects and by reducing automotive fire hazards heretofore caused by faulty battery connectors.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A protective device for a battery cable connector on a battery cable that is adapted to connect with a terminal post of a wet cell battery, comprising:

a hollow casing of flexible material including integral portions forming sidewalls and a bottom wall attached thereto, said bottom wall having an opening with substantially the same shape and dimensions as the base of the battery terminal, a sleeve member extending from one sidewall adapted to fit tightly around the battery cable and an upper wall means formed by an inwardly directed annular flange forming an opening larger than said bottom wall opening, a cover member retained under said upper wall means, and a grease fitting in said cover member to facilitate the passage of a noncorrosive fluid to the inside of said casing.

2. The device as described in claim 1, said opening being formed to closely receive a split-block type cable connector.

3. The device as described in claim 1 wherein said cover member is a rigid, clear plastic material.

4. The device as described in claim 1 wherein said casing has a generally oblong shape particularly adapted to fit around a split-block type cable connector.

5. The device as described in claim 1 wherein said casing is formed as one integral body from a synthetic rubber material.

* * * * *